United States Patent
Kawabe (10) Patent No.: US 12,505,321 B2
(45) Date of Patent: Dec. 23, 2025

(54) WIRELESS TAG READING SYSTEM, WIRELESS TAG READING DEVICE, AND METHOD

(71) Applicant: Toshiba Tec Kabushiki Kaisha, Tokyo (JP)

(72) Inventor: Yuichiro Kawabe, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/977,876

(22) Filed: Dec. 11, 2024

(65) Prior Publication Data

US 2025/0278585 A1    Sep. 4, 2025

(30) Foreign Application Priority Data

Mar. 1, 2024    (JP) ................ 2024-031214

(51) Int. Cl.
   *G06K 7/10*    (2006.01)
(52) U.S. Cl.
   CPC .................. *G06K 7/10366* (2013.01)
(58) Field of Classification Search
   CPC ... G06K 7/10366; G06Q 20/202; G07G 1/009
   USPC ........................................................ 235/451
   See application file for complete search history.

(56) References Cited

U.S. PATENT DOCUMENTS

| | | | |
|---|---|---|---|
| 2017/0372562 A1* | 12/2017 | Terahara | G06Q 20/202 |
| 2019/0098972 A1* | 4/2019 | Mutoh | B65D 25/38 |
| 2020/0143122 A1* | 5/2020 | Sakurai | G06K 7/10316 |
| 2022/0383003 A1* | 12/2022 | Suzuki | G06K 7/10089 |
| 2023/0004733 A1* | 1/2023 | Kawabe | G07G 1/01 |
| 2024/0095473 A1* | 3/2024 | Sakurai | G01S 5/02 |
| 2024/0095476 A1* | 3/2024 | Sakurai | G06K 7/10366 |

FOREIGN PATENT DOCUMENTS

EP    3454276 A1    3/2019
JP    2019-049840 A    3/2019

* cited by examiner

*Primary Examiner* — Ahshik Kim
(74) *Attorney, Agent, or Firm* — Kim & Stewart LLP (57) ABSTRACT

A wireless tag reading system includes a container to which a plurality of objects are attached and in which items can be stored, the objects being disposed along an outer periphery of the container, a table on which the container can be placed, a movable body movable under the table along a first rail and including an antenna and a sensor capable of detecting the objects, and a controller configured to cause the antenna to emit radio waves to communicate with wireless tags while controlling the movable body to move along the first rail, so that information about the items stored in the container can be read from wireless tags attached to the items. The controller is configured to adjust a strength of the radio waves upon detection of one of the objects by the sensor.

20 Claims, 9 Drawing Sheets

WIRELESS TAG READING SYSTEM, WIRELESS TAG READING DEVICE, AND METHOD

CROSS-REFERENCE TO RELATED APPLICATION(S)

This application is based upon and claims the benefit of priority from Japanese Patent Application No. 2024-031214, filed Mar. 1, 2024, the entire contents of which are incorporated herein by reference.

FIELD

Embodiments described herein relate generally to a wireless tag reading system, a wireless tag reading device, and a method.

BACKGROUND

A reading device for reading RFID (radio frequency identification) tags attached to items stored in a container such as a shopping basket has an antenna that radiates a radio wave from a location below a placement area on which the shopping basket is to be placed. Such a reading device moves the antenna relative to the placement area during the reading to improve the reading accuracy, which depends on the orientation of the tag or the position thereof.

If the antenna is moved relative to the placement area, the RFID tags outside the placement area may be erroneously read when the antenna has reached the edge of the placement area. For this reason, there is known a technique of detecting that the antenna has reached the edge of the placement area and reducing a strength of the radio wave radiated from the antenna.

However, in such a conventional reading device, when a shopping basket is placed such that a part of the basket is outside the placement area, there is a possibility that the RFID tags located outside the placement area cannot be read. In addition, when a shopping basket having a smaller size than that of a normal one is placed within the placement area, the reading efficiency may be negatively affected because the antenna may be moved to an area where no RFID tag exists.

SUMMARY OF THE INVENTION

Embodiments of the present disclosure provide a wireless tag reading system, a wireless tag reading device, and a method capable of efficiently and reliably reading an RFID tag attached to an item stored in a container.

In one embodiment, a wireless tag reading system comprises: a container to which a plurality of objects are attached and in which items can be stored, the objects being disposed along an outer periphery of the container; a table on which the container can be placed; a movable body movable under the table along a first rail and including an antenna and a sensor capable of detecting the objects; and a controller configured to cause the antenna to emit radio waves to communicate with wireless tags while controlling the movable body to move along the first rail so that information about the items stored in the container can be read from wireless tags attached to the items. The controller is configured to adjust a strength of the radio waves upon detection of one of the objects by the sensor.

DETAILED DESCRIPTION

Hereinafter, embodiments will be described in detail with reference to the drawings. The present invention is not limited to the embodiments described below.

Figure 1:
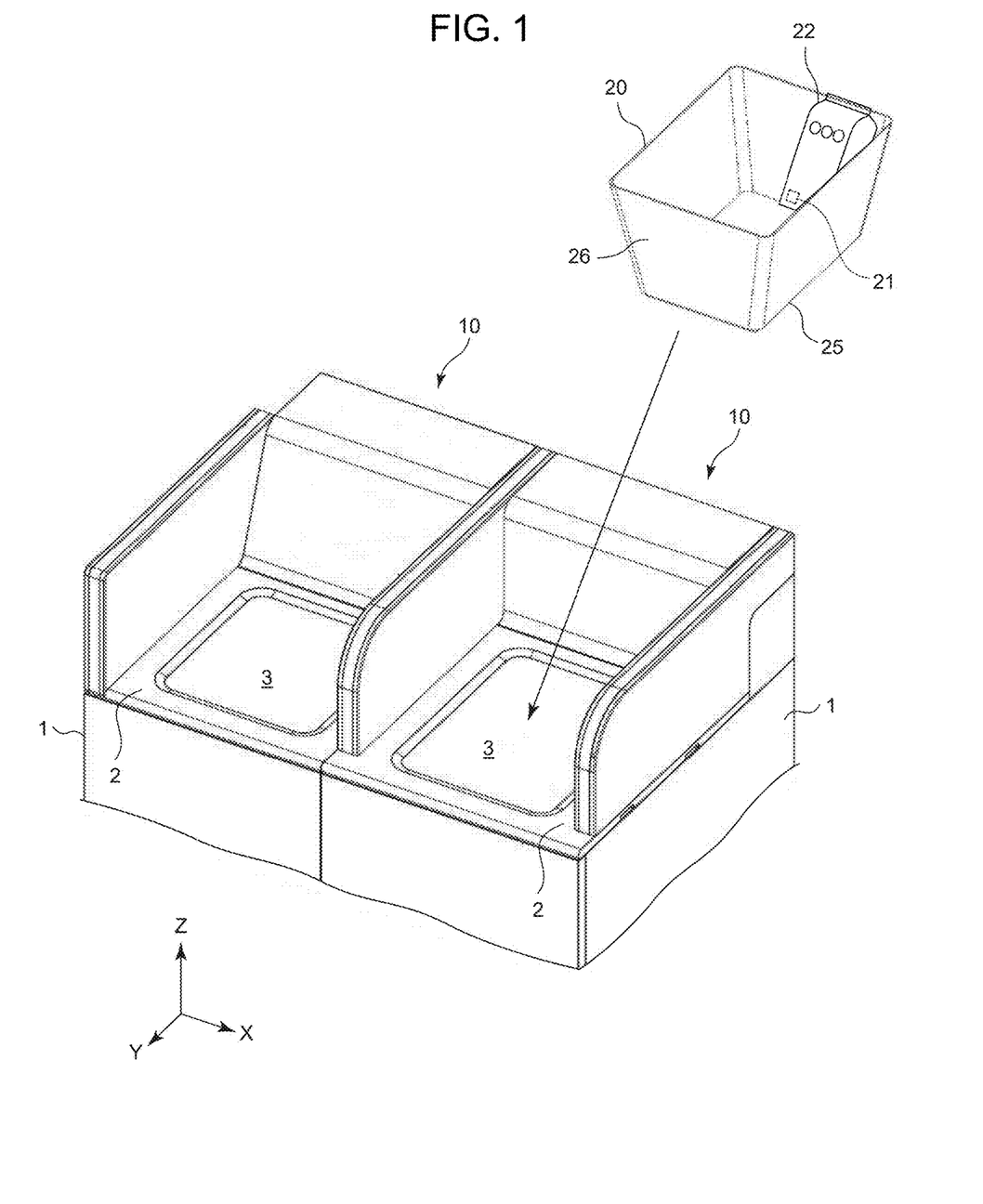
FIG. 1 is a perspective view illustrating a reading device according to a first embodiment.

As shown in FIG. 1, a reading device or station 10 according to a first embodiment includes a housing 1 including a substantially rectangular top plate 2. The top plate 2 has a horizontal placement surface 3 on which a shopping basket 20 containing an item 22 with an RFID tag 21 is placed. The top plate 2 functions as a basket table on which a shopping basket can be placed. The top plate 2 is formed of a material capable of transmitting radio waves for communicating with the RFID tag 21.

For example, the reading device 10 is installed in the check-out counter side by side with a POS (Point of Sale) terminal 100 (see FIG. 4) for registering and settling the item to be purchased. Although FIG. 1 shows an example in which two reading devices 10 are arranged side by side, at least one reading device 10 may be provided in the check-out counter.

In the following description, a direction in which two reading devices 10 are arranged is defined as a left-right direction, a direction parallel to the placement surface 3 and orthogonal to the left-right direction is defined as a front-rear direction, and a direction orthogonal to the left-right direction and the front-rear direction is defined as a vertical direction. In the drawings, a direction from left to right is indicated by an arrow X, a direction from back to front is indicated by an arrow Y, and a direction from bottom to top is indicated by an arrow Z.

Figure 2:
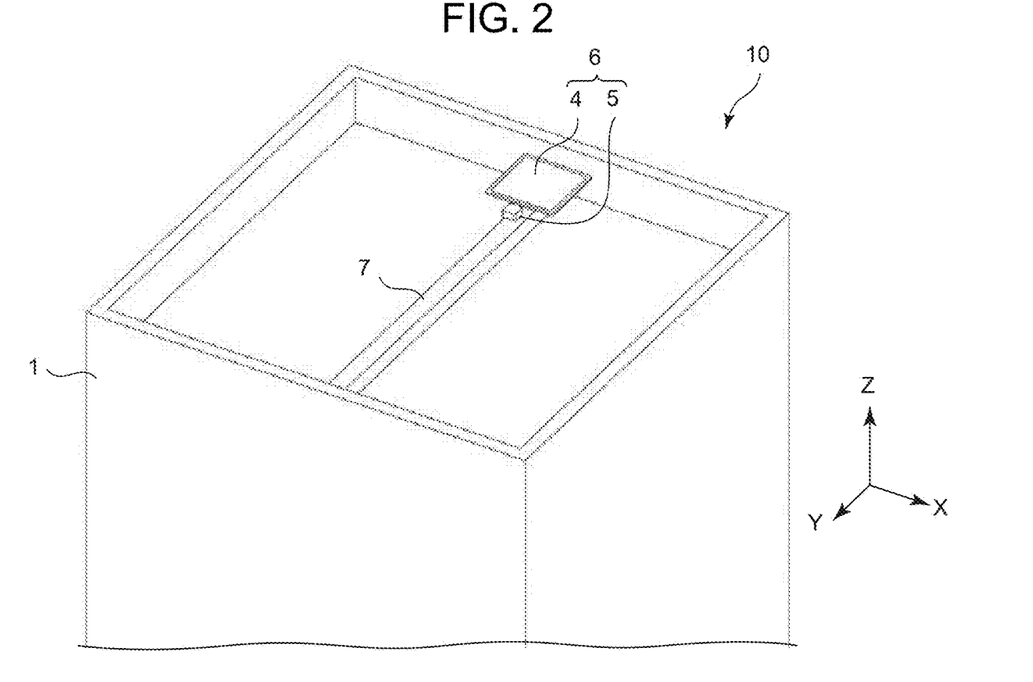
FIG. 2 is a schematic view showing a structure under a top plate of the reading device of FIG. 1.

FIG. 2 is a perspective view of the reading device 10 from which the top plate 2 is removed. The reading device 10 includes a movable body 6 in which the antenna 4 and the magnetic sensor 5 are integrally fixed under the top plate 2. The antenna 4 radiates radio waves that communicate with the RFID tag 21 attached to the item 22 in the shopping basket 20 on the placement surface 3 of the top plate 2. The magnetic sensor 5 detects the magnetic field generated by magnets 23 and 24 attached to the shopping basket 20 placed on the placement surface 3 (see FIG. 3).

Figure 3:
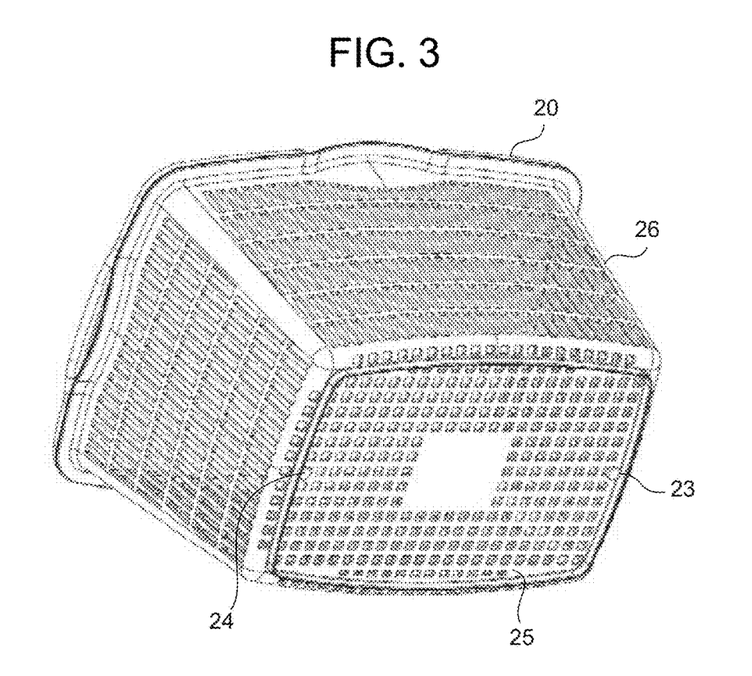
FIG. 3 is a perspective view of the shopping basket of FIG. 1 with a magnet attached to its bottom portion.

As shown in FIG. 3, the shopping basket 20 comprises two magnets 23 and 24 on the outer periphery of its bottom portion 25. The bottom portion 25 of the shopping basket 20 is generally rectangular and includes magnets 23 and 24 at the center of the short sides at both longitudinal ends thereof. The magnets 23 and 24 are attached to the shopping basket 20 by, for example, adhesive. The shopping basket 20 is placed on the placement surface 3 in a direction in which the longitudinal direction thereof is along the front-rear direction.

The magnets 23 and 24 need not necessarily be provided at the bottom portion 25 of the shopping basket 20. The magnets 23 and 24 may be attached to the outer periphery of the shopping basket 20. The outer peripheral portion of the shopping basket 20 includes, for example, a cylindrical peripheral portion 26 erected upward from each side of the bottom portion 25. The magnets 23 and 24 may be attached to the peripheral portion 26 or the like close to the bottom portion 25. In order to efficiently detect the magnetic field generated by the magnets 23 and 24 by the magnetic sensor 5 disposed under the placement surface 3, it is desirable that the magnets 23 and 24 be attached to the bottom portion 25 of the shopping basket 20 close to the placement surface 3.

Figure 4:
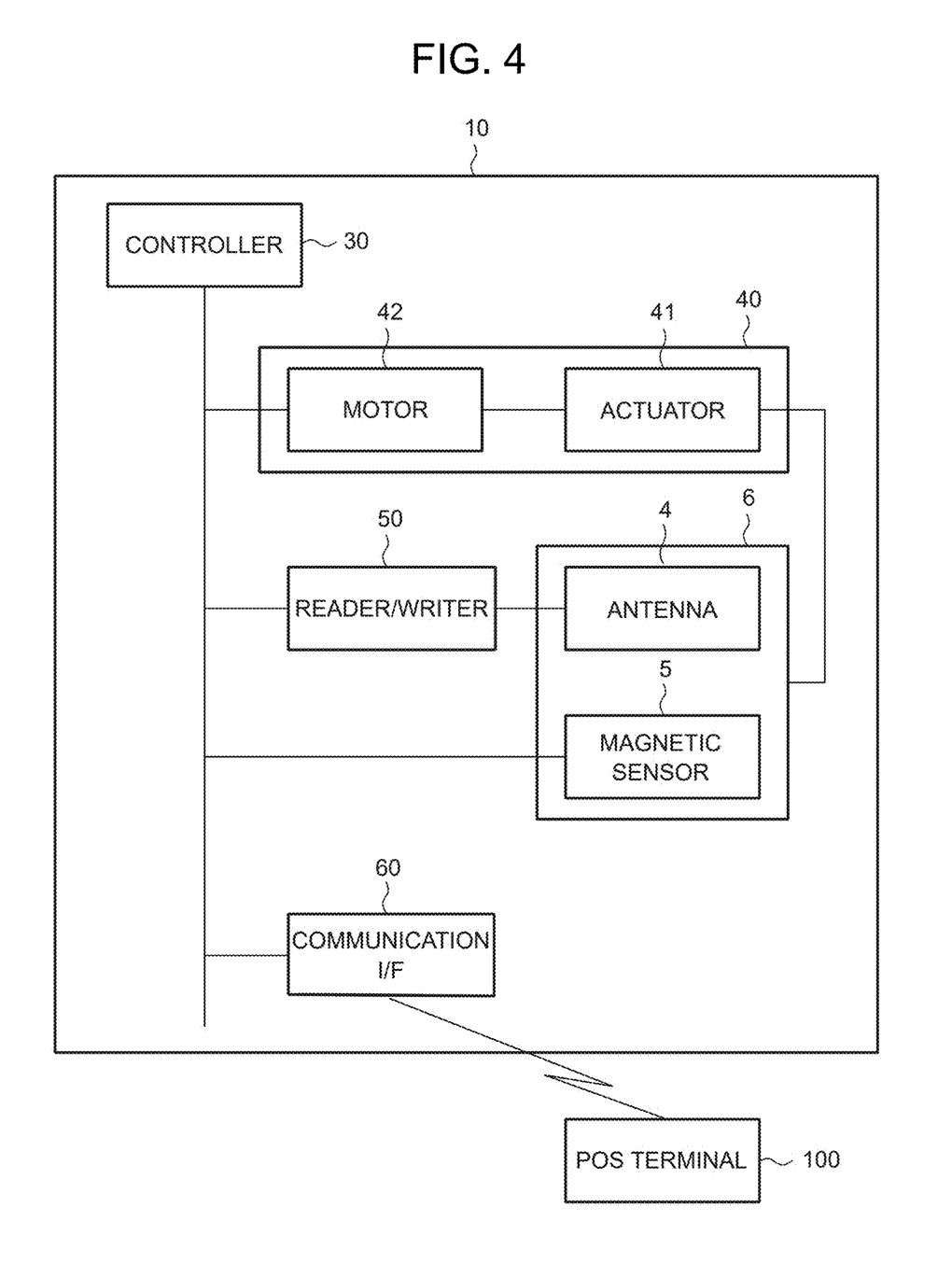
FIG. 4 is a block diagram illustrating a configuration of the reading device of FIG. 1.

As illustrated in FIG. 4, the reading device 10 includes a controller 30 (or a control circuit), a moving mechanism 40, a reader/writer 50, and a communication interface (I/F) 60.

The moving mechanism 40 moves and stops the movable body 6 in the front-rear direction along a rail 7 (see FIG. 2) extending in the front-rear direction under the top plate 2. The moving mechanism 40 includes an actuator 41 that moves the movable body 6 and a motor 42 that drives the actuator 41. The actuator 41 may be, for example, a ball screw in which a nut fixed to the movable body 6 is screwed to a screw shaft. In this case, the motor 42 is connected to one end of the screw shaft via a coupling.

The reader/writer 50 radiates radio waves towards the items 22 in the shopping basket 20 via the antenna 4, receives response wave from the RFID tags attached to the items 22 via the antenna 4, and reads information (hereinafter referred to as item information) related to each item 22, e.g., a name, a price, or the like of the item.

The controller 30 controls the communication I/F 60, which is a network interface circuit, to transmit the item information read by the reader/writer 50 to the POS terminal 100. The POS terminal 100 registers and checks out the item to be purchased based on the item information transmitted from the reading device 10, and receives a payment from the customer. The POS terminal 100 prints a receipt to be provided to the customer.

Figure 5:
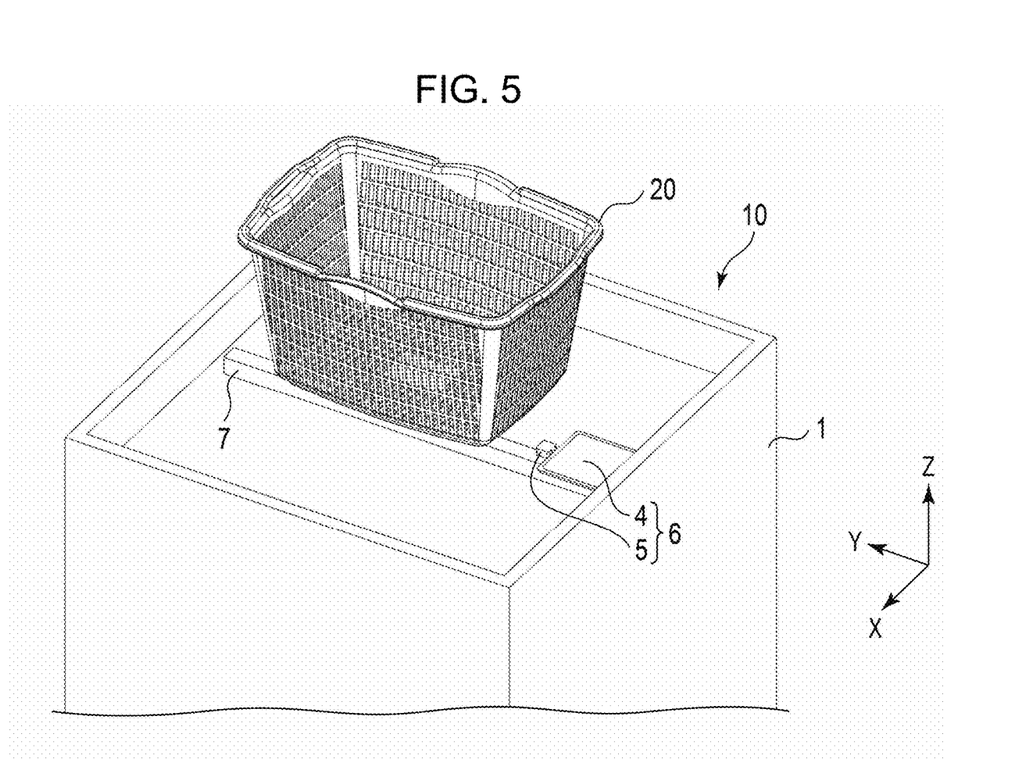
FIG. 5 is a diagram for explaining an operation of the reading device of FIG. 1.
Figure 6:
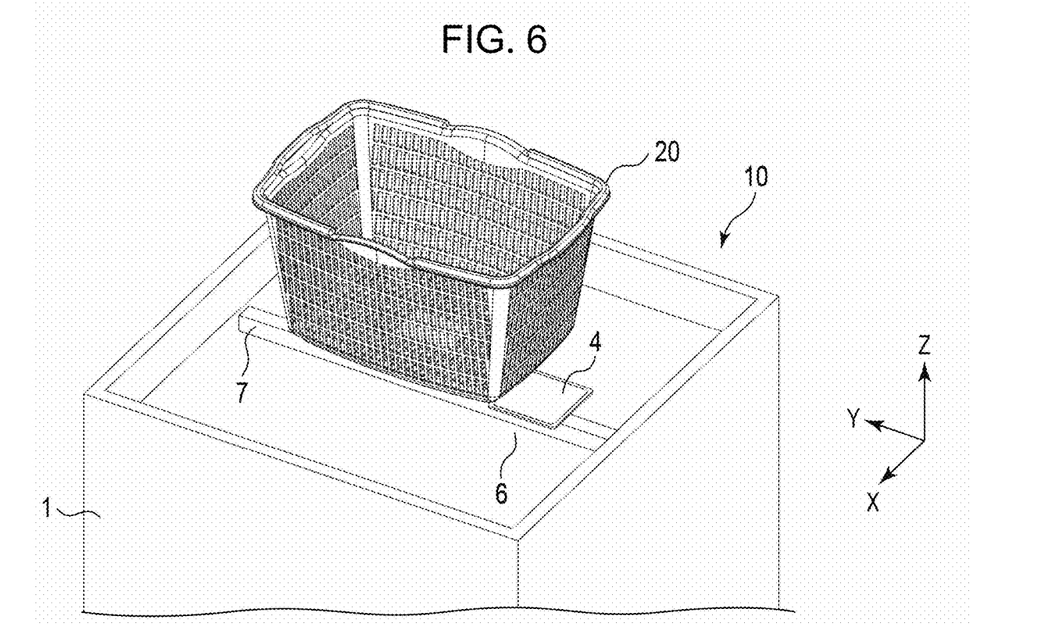
FIG. 6 is a diagram for explaining an operation of the reading device of FIG. 1.
Figure 7:
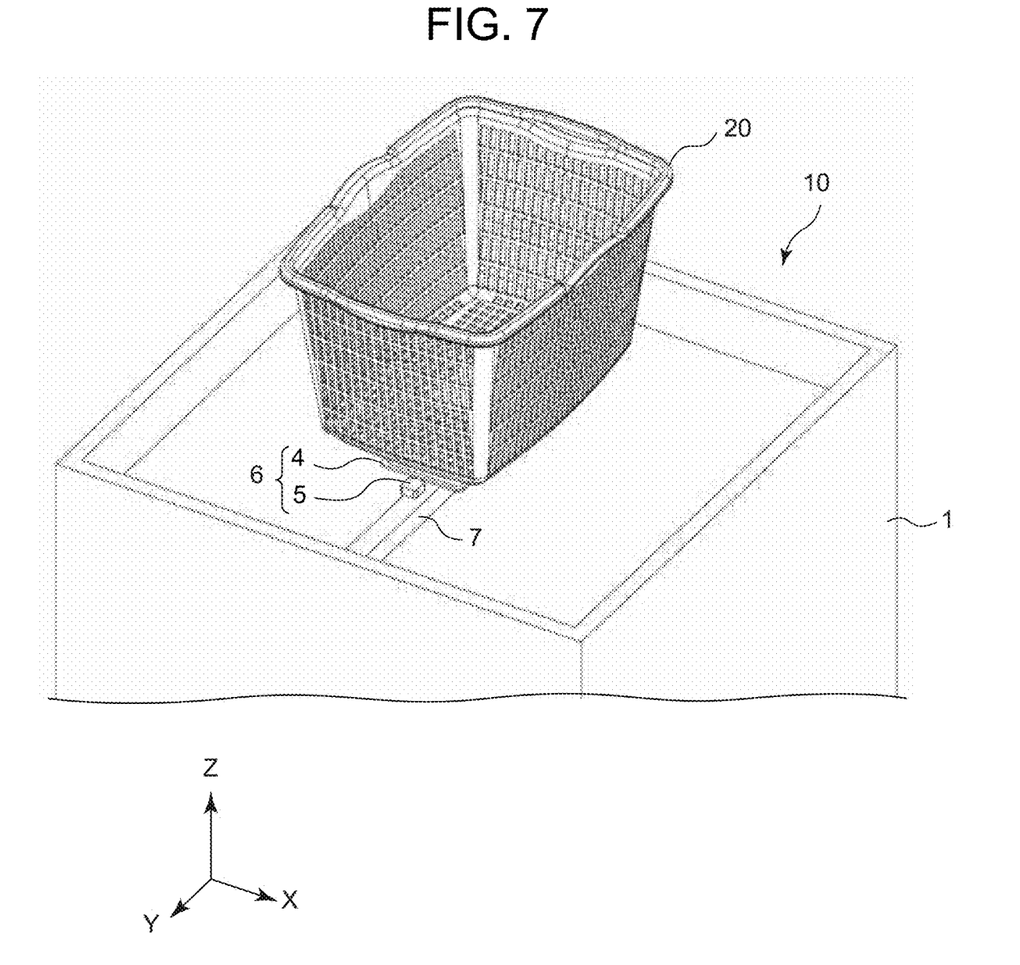
FIG. 7 is a diagram for explaining an operation of the reading device of FIG. 1.

Hereinafter, the reading operation performed by the controller 30 will be described mainly referring to FIGS. 5 to 7. As described above, the reading device 10 can move the movable body 6 only in one direction along the front-rear direction. Here, for ease of explanation, the antenna 4 and the magnetic sensor 5 are fixed at the same position of the movable body 6.

First, the reading operation in a first mode will be described. In the first mode, the controller 30 determines the position in the placement surface 3 of the area where the bottom portion 25 of the shopping basket 20 faces the placement surface 3 (hereinafter, referred to as the opposite area) based on the detection result by the magnetic sensor 5, and switches the intensity of the radio wave radiated from the antenna 4 in two stages of "strong" and "weak" based on the relative position of the opposite area and the antenna 4.

Here, the radio wave strength means the size of the area where communication with the RFID tag 21 can be performed.

First, when the RFID tag 21 of an item 22 placed in the shopping basket 20 is read, the shopping basket 20 storing the item 22 is placed on the placement surface 3 of the reading device 10. In a standby status prior to starting the reading of the RFID tag 21, the movable body 6 of the reading device 10 is positioned at the rearmost position along the rail 7 shown in FIGS. 2 and 5. In this state, the movable body 6 is at a position outside the opposite area. At this time, since the controller 30 does not detect the magnetic field via the magnetic sensor 5, it controls the reader/writer 50 so as to make the radio wave strength radiated from the antenna 4 "weak". Alternatively, the controller 30 controls the reader/writer 50 to set the radio wave strength radiated from the antenna 4 to zero in the standby state.

From this state, the controller 30 controls the motor 42 to operate the actuator 41 of the moving mechanism 40, and moves the movable body 6 in the standby position forward along the rail 7. When the magnetic sensor 5 approaches the shopping basket 20 placed on the placement surface 3 due to the forward movement of the movable body 6, the controller 30 detects the magnetic field from one of the magnets 23 via the magnetic sensor 5. This state is shown in FIG. 6. One of the magnets 23 is a magnet on the upstream side in the moving direction of the movable body 6 among the two magnets 23 and 24 provided in the shopping basket 20. That is, one of the magnets 23 is located at the upstream end of the opposite area along the moving direction of the movable body 6.

Based on the detection of the magnetic field of one of the magnets 23 via the magnetic sensor 5, the controller 30 determines that the antenna 4 is located in the opposite area of the bottom portion 25 of the shopping basket 20, and controls the reader/writer 50 to switch the radio wave strength radiated from the antenna 4 to "strong". The radio wave strength after the switching is a strength that can communicate with the RFID tag 21 of the item 22 in the shopping basket 20.

After that, the controller 30 moves the movable body 6 forward and passes the opposite area while keeping the radio wave strength "strong", communicates with the RFID tags 21 of all the items 22 in the shopping basket 20, and reads the RFID tags 21 of all the items 22 in the shopping basket 20. Then, the controller 30 controls the communication I/F 60 to transmit the read item information to the POS terminal 100.

After that, the controller 30 determines that the antenna 4 is placed on the placement surface 3 outside the opposite area where the bottom portion 25 of the shopping basket 20 faces, based on the detection of the magnetic field from the other magnet 24 via the magnetic sensor 5, and controls the moving mechanism 40 to stop the movable body 6. This state is shown in FIG. 7.

At this time, the controller 30 controls the reader/writer 50 to switch the radio wave strength radiated from the antenna 4 from "strong" to "weak". Alternatively, the controller 30 controls the reader/writer 50 to set the radio wave strength radiated from the antenna 4 to zero when the antenna 4 attempts to go out of the opposite area of the shopping basket 20.

As described above, when the RFID tag 21 is read in the first mode, the radio wave strength for reading the RFID tag 21 can be set to "strong" only when the antenna 4 is disposed in the opposite area where the bottom portion 25 of the shopping basket 20 placed on the placement surface 3 faces the placement surface 3, and the radio wave strength can be set to "weak" or "zero" when the antenna 4 moves to a position deviated from the opposite area. Therefore, when the reading device 10 is operated in the first mode, it is possible to suppress radio waves that are undesirably radiated to the outside of the shopping basket 20, and it is possible to prevent a problem that the RFID tag 21 outside the shopping basket 20 is erroneously read, and it is possible to reliably read only the RFID tags 21 of the items to be purchased contained in the shopping basket 20.

Further, when the reading device 10 is operated in the first mode, the RFID tags 21 of the items to be purchased can be efficiently read regardless of the size of the shopping basket 20. For example, when a relatively small shopping basket containing a small item or a small number of items is placed on the placement surface 3, the strength of radio waves radiated from the antenna 4 can be made "strong" only when the antenna 4 is present in the opposite area facing the bottom of the small shopping basket, and the moving distance of the antenna 4 can be minimized, and only the RFID tags 21 of the items in the shopping basket can be efficiently read.

Next, a reading operation in a second mode by the reading device 10 will be described. In the second mode, the controller 30 determines the position of the bottom portion 25 of the shopping basket 20 in the placement surface 3 of the opposite area facing the placement surface 3 based on the detection result by the magnetic sensor 5, switches the radio wave strength radiated from the antenna 4 based on the relative position of the opposite area and the antenna 4, and changes the moving direction of the antenna 4

First, when the RFID tag 21 of the item 22 placed in the shopping basket 20 is read, the shopping basket 20 storing the item 22 is placed on the placement surface 3 of the reading device 10. In a standby status prior to starting the reading of the RFID tag 21, the movable body 6 of the reading device 10 is positioned at the rearmost position along the rail 7 shown in FIGS. 2 and 5. In this state, the movable body 6 is at a position outside the opposite area. At this time, since the controller 30 does not detect the magnetic field via the magnetic sensor 5, it controls the reader/writer 50 so as to make the radio wave strength radiated from the antenna 4 "weak". Alternatively, the controller 30 controls the reader/writer 50 to set the radio wave strength radiated from the antenna 4 to zero in the standby state.

From this state, the controller 30 controls the motor 42 to operate the actuator 41 of the moving mechanism 40, and moves the movable body 6 in the standby position forward along the rail 7. When the magnetic sensor 5 approaches the shopping basket 20 placed on the placement surface 3 due to the forward movement of the movable body 6, the controller 30 detects the magnetic field from one of the magnets 23 via the magnetic sensor 5. This state is shown in FIG. 6. One of the magnets 23 is a magnet on the upstream side in the moving direction of the movable body 6 among the two magnets 23 and 24 provided on the shopping basket 20. That is, one of the magnets 23 is located at the upstream end of the opposite area along the moving direction of the movable body 6.

Based on the detection of the magnetic field of one of the magnets 23 via the magnetic sensor 5, the controller 30 determines that the antenna 4 is located in the opposite area of the bottom portion 25 of the shopping basket 20, and controls the reader/writer 50 to switch the radio wave strength radiated from the antenna 4 to "strong". The radio wave strength after the switching is a strength that can communicate with the RFID tag 21 of the item 22 in the shopping basket 20.

After that, the controller 30 moves the movable body 6 forward and passes the opposite area while keeping the radio wave strength "strong", communicates with the RFID tags 21 of all the items 22 in the shopping basket 20, and reads information from the RFID tags 21 of all the items 22 in the shopping basket 20. Then, the controller 30 controls the communication I/F 60 to transmit the read item information to the POS terminal 100.

After that, the controller 30 determines that the antenna 4 is located on the placement surface 3 outside the opposite area where the bottom portion 25 of the shopping basket 20 faces, based on the detection of the magnetic field from the other magnet 24 via the magnetic sensor 5, and controls the moving mechanism 40 to move the movable body 6 in the reverse direction. This state is shown in FIG. 7.

As described above, when the RFID tag 21 is read in the second mode, the antenna 4 does not move to a position deviated from the opposite area, and radio waves for reading the RFID tag 21 can be radiated only when the antenna 4 is disposed in the opposite area where the bottom portion 25 of the shopping basket 20 placed on the placement surface 3 faces the placement surface 3. Therefore, when the reading device 10 is operated in the second mode, it is possible to suppress radio waves that are undesirably radiated to the outside of the shopping basket 20, and it is possible to prevent a problem that the RFID tag 21 outside the shopping basket 20 is erroneously read, and it is possible to reliably read only the RFID tag 21 of the item to be purchased contained in the shopping basket 20.

Further, when the reading device 10 is operated in the second mode, the RFID tags 21 of the item to be purchased can be efficiently read regardless of the size of the shopping basket 20. For example, when a relatively small shopping basket containing a small item or a small number of items is placed on the placement surface 3, radio waves can be radiated from the antenna 4 only when the antenna 4 is present in the opposite area facing the bottom of the small shopping basket, and only the RFID tags 21 of the items in the shopping basket can be efficiently read.

Hereinafter, a second embodiment will be described with reference to FIGS. 8 to 14. Here, components that function similarly to the reading device 10 of the first embodiment described above are denoted by the same reference numerals, and detailed description thereof will be omitted.

Figure 8:
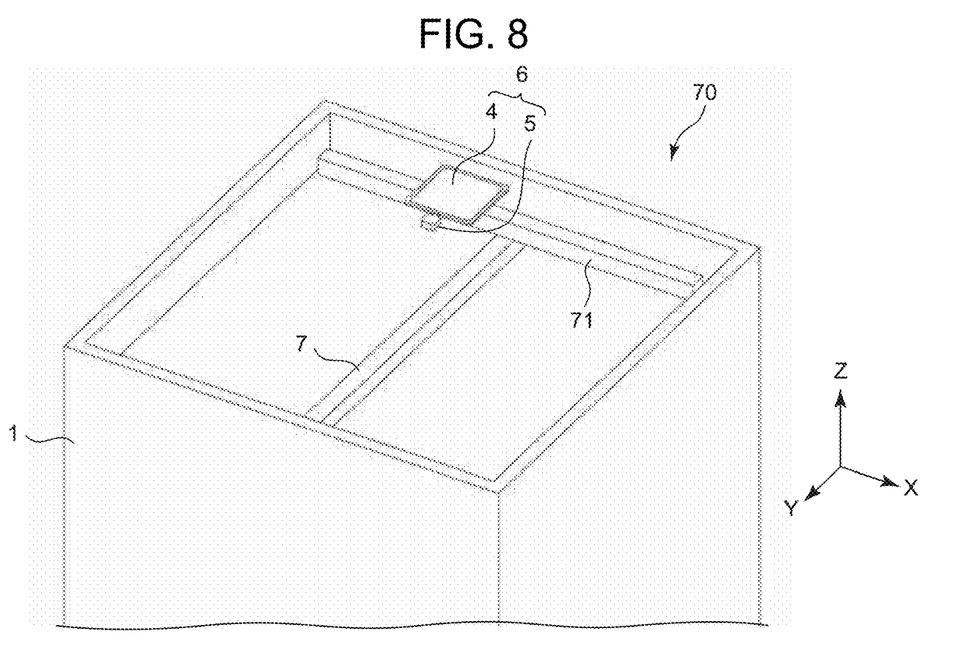
FIG. 8 is a schematic diagram illustrating a main part of a reading device according to a second embodiment.

As illustrated in FIG. 8, a reading device or station 70 according to the second embodiment includes a movable body 6 in which an antenna 4 and a magnetic sensor 5 are fixed under the top plate 2 (not shown). The reading device 70 includes a rail 71 to which the movable body 6 is mounted so as to be movable in the left-right direction. The rail 71 is movable in the front-rear direction along the rail 7. That is, the movable body 6 is movable in the front-rear-left-right direction in a predetermined area (hereinafter referred to as the movable area) of a rectangle along the placement surface 3 by the moving mechanism 40.

Figure 9:
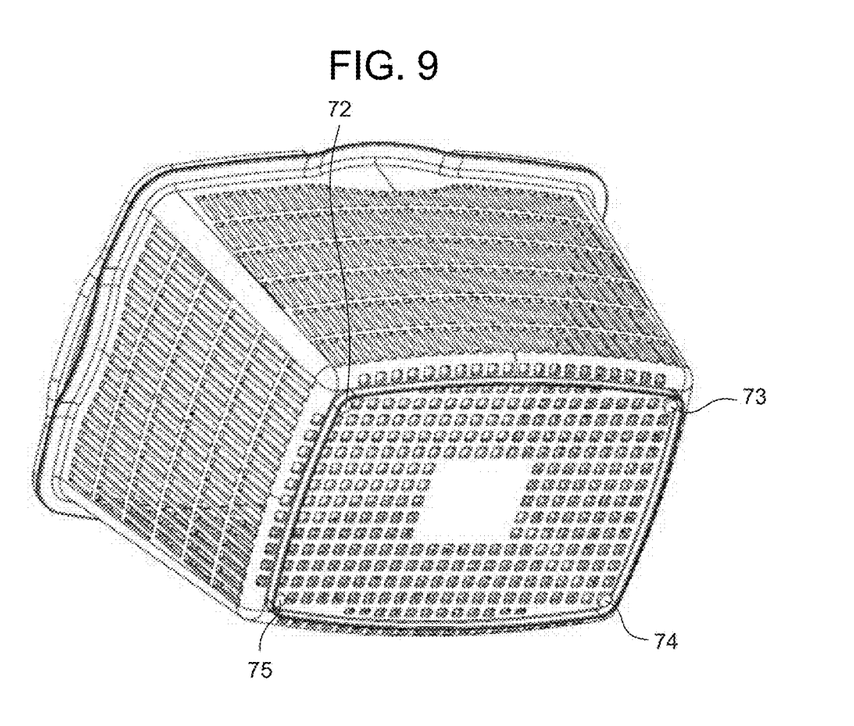
FIG. 9 is a perspective view of a shopping basket placed on a placing surface of the reading device of FIG. 8.
Figure 10:
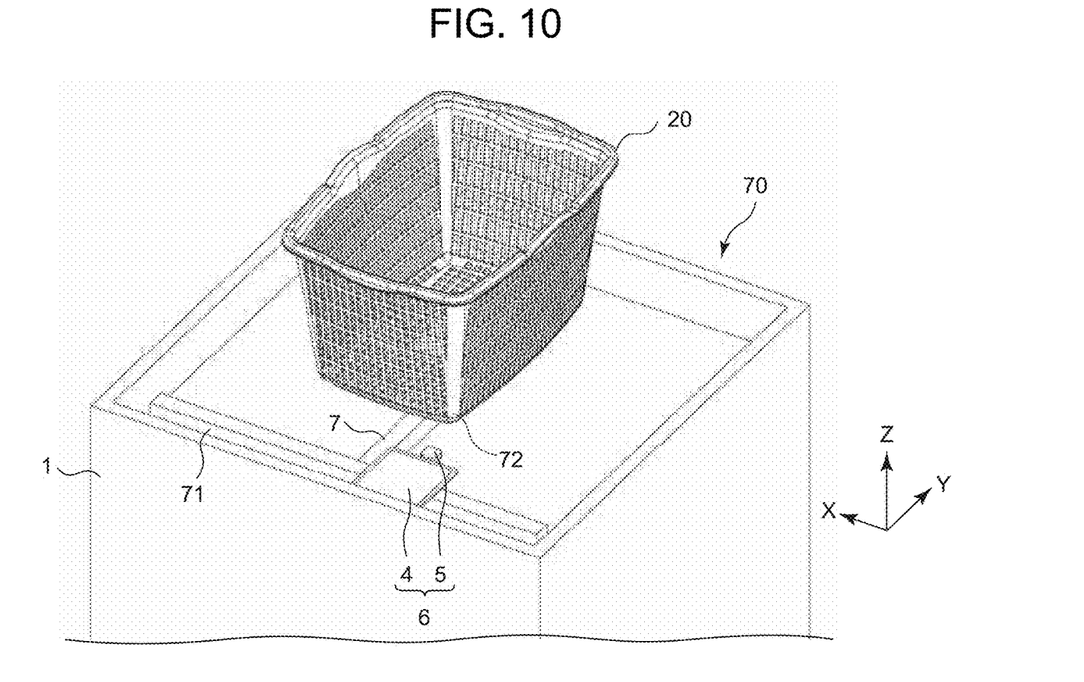
FIG. 10 is a diagram for explaining an operation of the reading device of FIG. 8.

As shown in FIG. 9, the shopping basket 20 comprises four magnets 72, 73, 74, and 75 on the outer periphery of its bottom portion 25. The bottom portion 25 of the shopping basket 20 is generally rectangular and includes the magnets 72, 73, 74, and 75 at four corners thereof. The magnets 72, 73, 74, and 75 are attached to the shopping basket 20 by, for example, adhesive. The shopping basket 20 is placed on the placement surface 3 in a direction in which the longitudinal direction thereof is along the front-rear direction. In the following description, the magnet 72 is disposed on the rear left side, the magnet 73 is disposed on the front left side, the magnet 74 is disposed on the front right side, and the magnet 75 is disposed on the rear right side in a state where the shopping basket 20 is placed on the placement surface 3.

The magnets 72, 73, 74, and 75 need not necessarily be provided at the bottom portion 25 of the shopping basket 20. The magnets 72, 73, 74, and 75 may be attached to the outer periphery of the shopping basket 20. The outer peripheral portion of the shopping basket 20 includes, for example, a cylindrical peripheral portion 26 erected upward from each side of the bottom portion 25. The magnets 72, 73, 74, and 75 may be attached, such as to the peripheral portion 26 near the bottom portion 25. In order to efficiently detect the magnetic field by the magnets 72, 73, 74, and 75 by the magnetic sensor 5 disposed under the placement surface 3, it is desirable that the magnets 72, 73, 74, and 75 be attached to the bottom portion 25 of the shopping basket 20 close to the placement surface 3.

Hereinafter, an exemplary reading operation by the controller 30 of the reading device 70 will be described. As described above, the reading device 70 of the present embodiment is capable of moving the movable body 6 along the placement surface 3 in two directions, i.e., in both the left-right direction and the front-rear direction.

Based on the detection result by the magnetic sensor 5, the controller 30 determines the position of the bottom portion 25 of the shopping basket 20 in the placement surface 3 of the opposite area facing the placement surface 3, based on the relative position of the opposite area and the antenna 4, the radio wave strength radiated from the antenna 4 is switched in two stages of "strong" and "weak", and the moving direction of the antenna 4 is changed.

First, when the RFID tag 21 of the item 22 placed in the shopping basket 20 is read, the shopping basket 20 containing the item 22 is placed on the placement surface 3 of the reading device 70 in the above-described direction. In a standby status prior to starting the reading of the RFID tag 21, the movable body 6 of the reading device 70 is positioned at the rearmost position along the rail 7 shown in FIGS. 8 and 10. In this state, the movable body 6 is at a position outside the opposite area. In other words, the opposite area of the shopping basket 20 is a size included in the movable area in which the movable body 6 is movable.

In a state where the shopping basket 20 is placed on the placement surface 3 as described above, the controller 30 controls the reader/writer 50 so that the radio wave strength radiated from the antenna 4 is "weak" because any magnetic field is not detected via the magnetic sensor 5. Alternatively, the controller 30 controls the reader/writer 50 to set the radio wave strength radiated from the antenna 4 to zero in the standby state.

Figure 11:
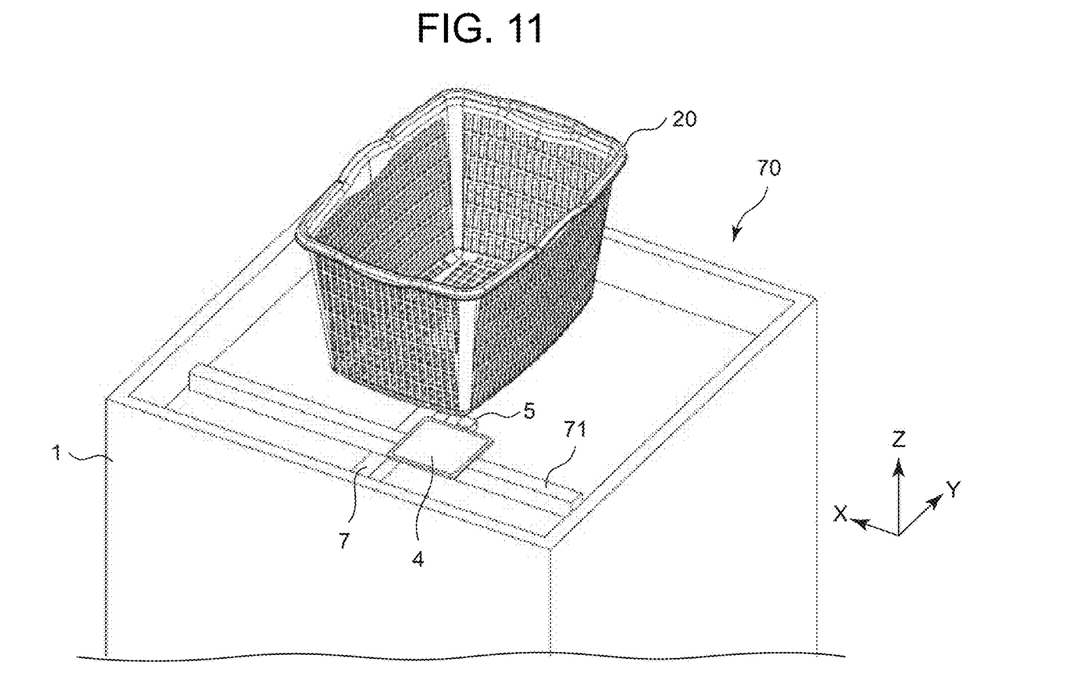
FIG. 11 is a diagram for explaining an operation of the reading device of FIG. 8.

From this state, the controller 30 controls the moving mechanism 40 to move the rail 71 to which the movable body 6 is attached forward along the rail 7. When the magnetic sensor 5 approaches the shopping basket 20 placed on the placement surface 3 due to the forward movement of the movable body 6, the controller 30 detects the magnetic field from the magnet 72 on the rear left side, for example, via the magnetic sensor 5. This state is shown in FIG. 11. At this time, when the movable body 6 is arranged at a position shifted to the right along the rail 71 or the shopping basket 20 is arranged at a position shifted to the left, the magnet for detecting the magnetic field via the magnetic sensor 5 may be the magnet 75 on the rear right side.

Based on the detection of the magnetic field of the magnet 72 via the magnetic sensor 5, the controller 30 determines that the antenna 4 is located in the opposite area of the bottom portion 25 of the shopping basket 20, and controls the reader/writer 50 to switch the radio wave strength radiated from the antenna 4 to "strong". The radio wave strength after the switching is a strength that can communicate with the RFID tag 21 of the item 22 in the shopping basket 20.

After that, the controller 30 moves the movable body 6 forward and passes the opposite area while keeping the radio wave strength "strong", communicates with the RFID tag 21 of the item 22 in the shopping basket 20, and reads information from the RFID tag 21 of the item 22 in the shopping basket 20. Then, the controller 30 controls the communication I/F 60 to transmit the read item information to the POS terminal 100.

Figure 12:
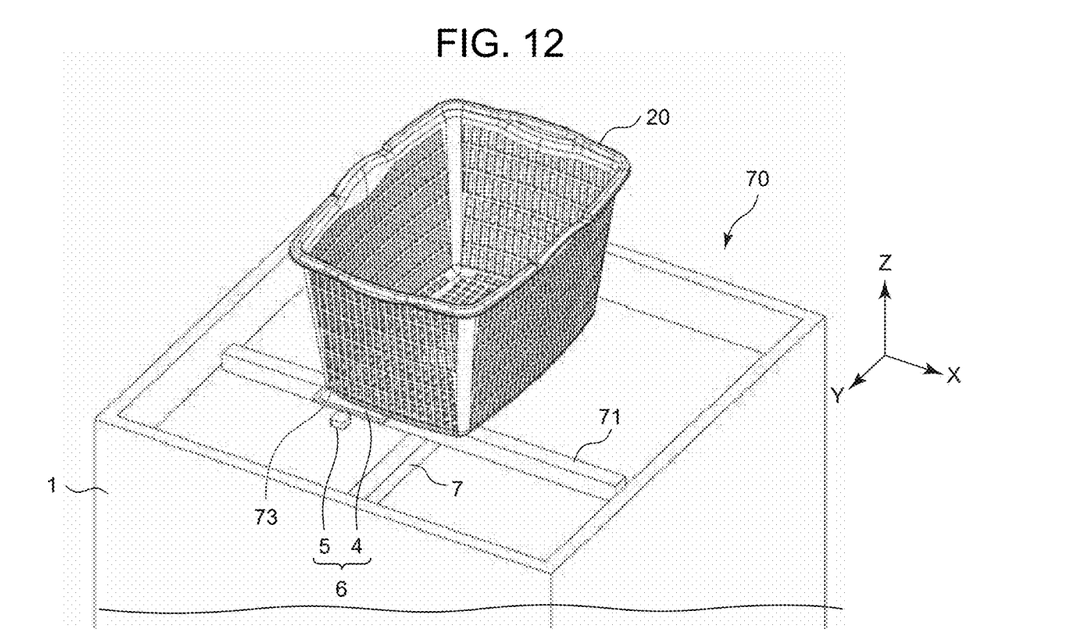
FIG. 12 is a diagram for explaining an operation of the reading device of FIG. 8.

Then, the controller 30, based on the detection of the magnetic field from the magnet 73 on the front left side via the magnetic sensor 5, the bottom portion 25 of the shopping basket 20 on the placement surface 3 determines that the antenna 4 has reached the front outside of the facing area facing, and stops the movement of the movable body 6 forward by controlling the moving mechanism 40. This state is shown in FIG. 12.

Figure 13:
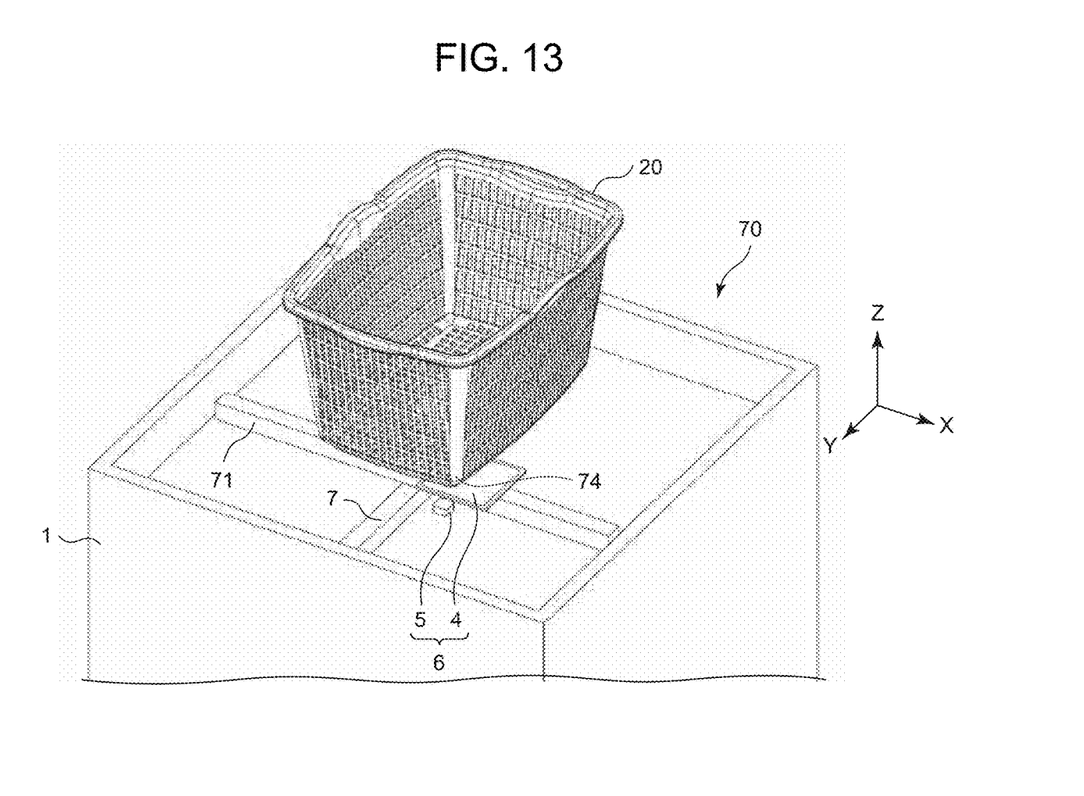
FIG. 13 is a diagram for explaining an operation of the reading device of FIG. 8.

After that, the controller 30 changes the moving direction of the movable body 6 to the rightward direction, and continues reading the RFID tag 21. Then, based on the magnetic sensor 5 detecting the magnetic field of the magnet 74 on the front right side, the controller 30 stops the movement of the movable body 6 in the right direction. This state is shown in FIG. 13.

Figure 14:
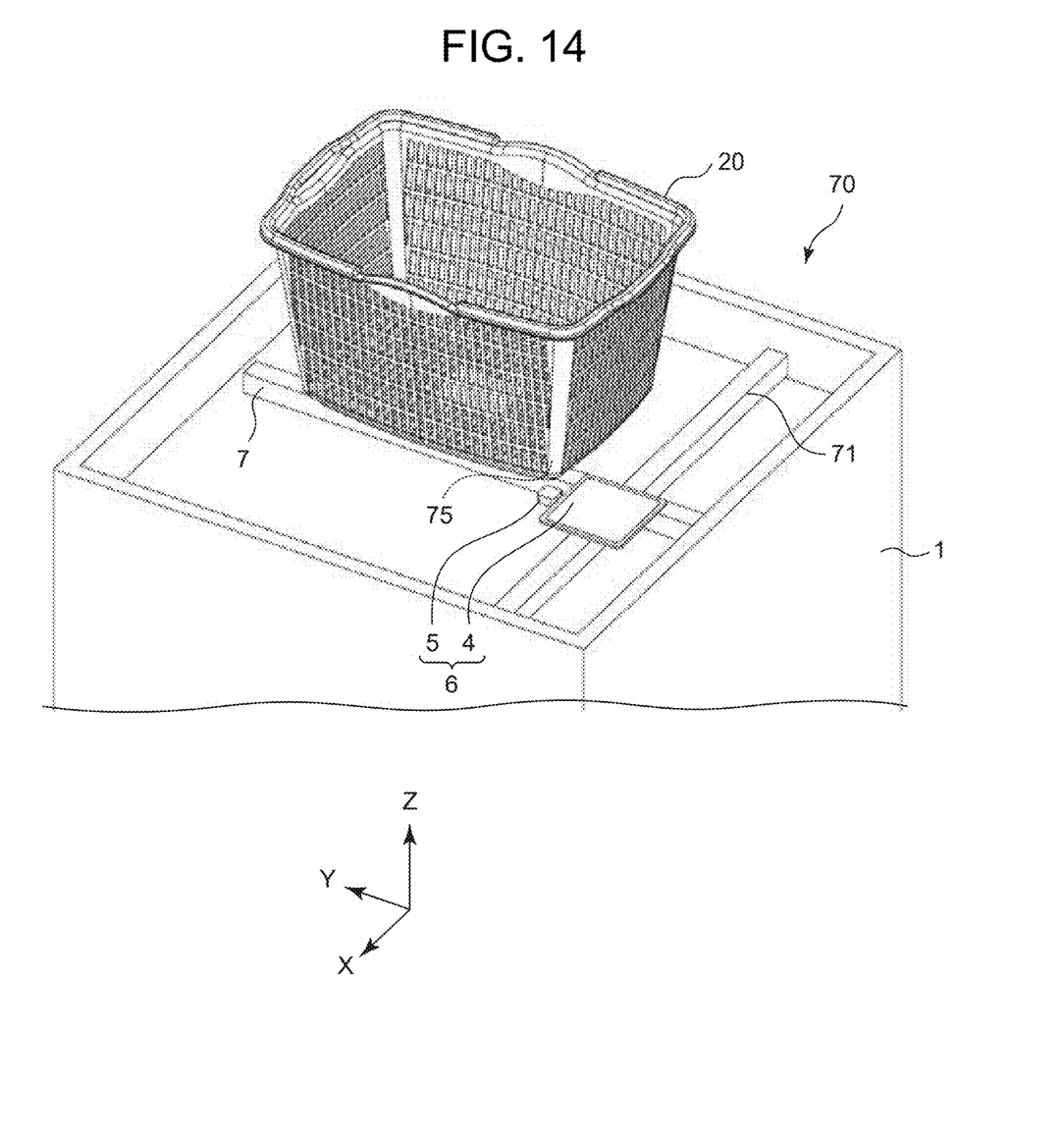
FIG. 14 is a diagram for explaining an operation of the reading device of FIG. 8.

Thereafter, the controller 30 further changes the moving direction of the movable body 6 backward to continue reading the RFID tags 21, and stops the movement of the movable body 6 backward at a time point when the magnetic sensor 5 detects the magnetic field of the magnets 75 on the rear right side. This state is shown in FIG. 14. Further thereafter, the controller 30 changes the moving direction of the movable body 6 to the left, and continues reading the RFID tag 21. The movable body 6 is stopped when the magnetic field of the magnet 72 is detected on the rear left side via the magnetic sensor 5, and the radio wave strength radiated through the antenna 4 is set to 0 at the end of the reading operation.

As described above, according to the second embodiment, the radio wave strength for reading the RFID tag 21 can be set to "strong" only when the antenna 4 is disposed in the opposite area where the bottom portion 25 of the shopping basket 20 placed on the placement surface 3 faces the placement surface 3, and the radio wave strength can be set to "weak" or "zero" when the antenna 4 moves to a position deviated from the opposite area. Therefore, according to the present embodiment, it is possible to suppress radio waves that are undesirably radiated to the outside of the shopping basket 20, and it is possible to prevent the RFID tag 21 outside the shopping basket 20 from being erroneously read, and it is possible to reliably read only the RFID tag 21 of the item to be purchased included in the shopping basket 20.

According to the second embodiment, it is possible to efficiently read the RFID tag 21 of the item to be purchased regardless of the size of the shopping basket 20. For example, when a relatively small shopping basket containing a small item or a small number of items is placed on the placement surface 3, the strength of radio waves radiated from the antenna 4 can be made "strong" only when the antenna 4 is present in an opposite area facing the bottom of the small shopping basket, and the moving distance of the antenna 4 can be minimized, and only the RFID tags 21 of the items in the shopping basket can be efficiently read.

Further, according to the second embodiment, since the magnet attached to the outer peripheral portion of the shopping basket 20 placed on the placement surface 3 is detected so that the shopping basket 20 reads only the RFID tag 21 in the opposite area facing each other, it is possible to reliably read the RFID tag 21 of the item to be purchased even if the shopping basket 20 is placed anywhere within the movable area of the antenna 4. As described above, by making the movable area of the antenna 4 larger than the opposite area of the shopping basket 20, it is possible to reliably read the RFID tag 21 without worrying about the position where the shopping basket 20 is placed on the placement surface 3.

In the above-described embodiments, the magnetic sensor 5 is used as a detection unit for detecting the opposite area of the shopping basket 20, and the magnets 23 and 24 or 72 through 75 are used as the detection target, but any detection means may be used. For example, the magnetic sensor 5 may be omitted, and an RFID tag for detecting the opposite area of the shopping basket 20 may be attached to the shopping basket 20 instead of the magnets, and the facing area may be detected by reading the RFID tag attached to the shopping basket 20 through the antenna 4.

Further, in the above-described embodiments, for easy understanding of the description, the antenna 4 and the magnetic sensor 5 are provided at the same position of the movable body 6, but the antenna 4 and the magnetic sensor 5 in an actual device can be aligned in the direction along the placement surface 3. Therefore, in the actual control, in consideration of the deviation in the horizontal direction of the antenna 4 and the magnetic sensor 5, it is necessary to determine the timing of moving and stopping the movable body 6, and the timing of switching the radio wave strength radiated from the antenna 4.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading system comprising:
    a container to which a plurality of objects are attached and in which items can be stored, the objects being disposed along an outer periphery of the container;
    a table on which the container can be placed;
    a movable body movable under the table along a first rail and including an antenna and a sensor capable of detecting the objects; and
    a controller configured to cause the antenna to emit radio waves to communicate with wireless tags while controlling the movable body to move along the first rail, so that information about the items stored in the container can be read from wireless tags attached to the items, wherein
    the controller is configured to adjust a strength of the radio waves upon detection of one of the objects by the sensor.

2. The wireless tag reading system according to claim 1, wherein the objects include magnets and the sensor includes a magnetic sensor.

3. The wireless tag reading system according to claim 2, wherein the magnets are disposed at four corners of a bottom surface of the container.

4. The wireless tag reading system according to claim 1, wherein the controller is configured to switch the strength of the radio waves between a first strength and a second strength that is stronger than the first strength.

5. The wireless tag reading system according to claim 4, wherein the controller is configured to set the strength to the first strength when controlling the movable body to begin the movement.

6. The wireless tag reading system according to claim 5, wherein the controller is configured to set the strength to the second strength upon detection of one of the objects by the sensor after controlling the movable body to begin the movement.

7. The wireless tag reading system according to claim 6, wherein the controller is configured to set the strength to the first strength upon detection of one of the objects by the sensor after the second strength was set.

8. The wireless tag reading system according to claim 6, wherein the controller is configured to control the movable body to stop upon detection of one of the objects by the sensor after the second strength was set.

9. The wireless tag reading system according to claim 1, wherein the movable body is movable further along a second rail extending perpendicular to the first rail.

10. The wireless tag reading system according to claim 1, wherein the container is a shopping basket, and the objects are attached to a bottom surface of the basket.

11. A wireless tag reading device comprising:
    a table on which a container for storing items can be placed;
    a movable body movable under the table along a first rail and including an antenna and a sensor capable of detecting objects that are attached to the container along an outer periphery thereof; and
    a controller configured to cause the antenna to emit radio waves to communicate with wireless tags while controlling the movable body to move along the first rail, so that information about the items stored in the container can be read from wireless tags attached to the items, wherein
    the controller is configured to adjust a strength of the radio waves upon detection of one of the objects by the sensor.

12. The wireless tag reading device according to claim 11, wherein the objects include magnets and the sensor includes a magnetic sensor.

13. The wireless tag reading device according to claim 12, wherein the magnets are disposed at four corners of a bottom surface of the container.

14. The wireless tag reading device according to claim 11, wherein the controller is configured to switch the strength of the radio waves between a first strength and a second strength that is stronger than the first strength.

15. The wireless tag reading device according to claim 14, wherein the controller is configured to set the strength to the first strength when controlling the movable body to begin the movement.

16. The wireless tag reading device according to claim 15, wherein the controller is configured to set the strength to the second strength upon detection of one of the objects by the sensor after controlling the movable body to begin the movement.

17. The wireless tag reading device according to claim 16, wherein the controller is configured to set the strength to the first strength upon detection of one of the objects by the sensor after the second strength was set.

18. The wireless tag reading device according to claim 16, wherein the controller is configured to control the movable body to stop upon detection of one of the objects by the sensor after the second strength was set.

19. The wireless tag reading device according to claim 11, wherein the movable body is movable further along a second rail extending perpendicular to the first rail.

20. A method performed by a wireless tag reading device that includes a table on which a container for storing items can be placed, and a movable body movable under the table along a first rail and including an antenna and a sensor capable of detecting objects that are attached to the container along an outer periphery thereof, the method comprising:
   causing the antenna to emit radio waves to communicate with wireless tags while controlling the movable body to move along the first rail, so that information about the items stored in the container can be read from wireless tags attached to the items; and
   adjusting a strength of the radio waves upon detection of one of the objects by the sensor when the movable body moves along the first rail.

* * * * *